Patented Aug. 23, 1932

1,873,628

UNITED STATES PATENT OFFICE

HEINRICH OHLENDORF, OF DESSAU IN ANHALT, GERMANY, ASSIGNOR TO GENERAL ANILINE WORKS, INC., OF NEW YORK, N. Y., A CORPORATION OF DELAWARE

MONOAZO DYE

No Drawing. Application filed April 1, 1931, Serial No. 527,051, and in Germany April 11, 1930.

My present invention relates to a new process of manufacturing azo dyes and to the new dyes obtainable by this process.

According to my invention new monoazo dyes of very good properties are obtainable by transforming a 1.2-naphthophenazine derivative substituted in the 8-position of the naphthalene nucleus by the amino group and corresponding to the general formula

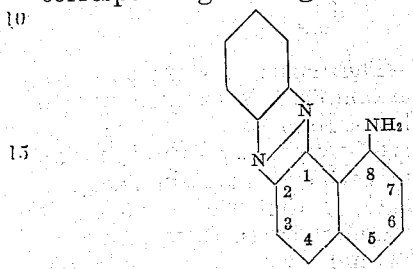

(in which the naphthalene and/or the benzene nucleus may be substituted by sulfonic acid groups or by a univalent substituent as, for instance, alkyl, halogen or nitro) into the diazo compound and combining the latter with a compound of any kind capable of being coupled.

There can be used as coupling components inter alia hydroxy or amino compounds of the naphthalene series, hydroxy compounds of the benzene series, pyrazolone derivatives or also aliphatic compounds capable of coupling, such as, for instance, β-diketones such as acetyl acetone, and derivatives of aceto-acetic acid ester.

According to the choice of the components, there can be produced dyes dyeing a great variety of tints and useful for the most different fields of application, for instance, wool dyes, dyes for lake-making, pigments, fat-soluble dyes etc.

The dyes are valuable owing to their good fastness properties.

The wool dyes, for instance, are distinguished by a good fastness to fulling, hot-pressing and potting, and by an extra high fastness to light. Monoazo dyes of good fastness to light are already obtained with hydroxy compounds of the naphthalene or benzene series as coupling components. The fastness to rubbing of the dyeings is remarkable.

The dyes which can be used as pigments etc. (in the presence of sulfo groups, for instance, also in the form of their barium and calcium salts or the like) have a remarkable clarity of tint, good covering power and fastness to light.

By a suitable selection of the components, the dyes can also be produced on a suitable substratum, for instance, on the vegetable fiber.

The following examples illustrate the invention without limiting it, the parts being by weight:

*Example 1.*—34.7 parts of sodium 8-amino-1.2-naphthophenazine-5-sulfonate of the formula:

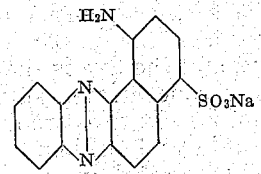

obtainable for instance, by condensing 8-acetylamino-1.2-naphthoquinone-5-sulfonic acid (which in itself may be produced by reducing the nitroso compound of 8-acetylamino-1-hydroxynaphthalene-5-sulfonic acid and by oxidizing the amino compound formed) with 1.2-diaminobenzene and by splitting off the acetyl group by saponification, are dissolved in 800 parts of water and transformed in the usual manner with 6.9 parts of sodium nitrite and 24 parts of hydrochloric acid of 23° Bé. into the diazo compound which after the diazotization is complete, is precipitated in the form of feebly yellow needles being very difficultly soluble in water. The suspension of the diazo compound is run, while stirring, into an ice-cold solution of 25 parts of sodium 2-hydroxynaphthalene-6-sulfonate, to which a solution of 18 parts of sodium carbonate in 250 parts of water has been added. After stirring for several hours, the dye is salted out. It forms in a dry state a red powder which dissolves in water to a yellowish-red solution and in concentrated sulfuric acid to a ruby-colored solution. It dyes wool a tint of a good fastness to fulling and an unusually high fastness to light.

The new dye as free acid probably corresponds to the formula:

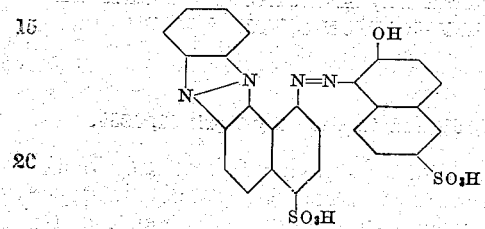

Similar dyes are obtainable by substituting 2-hydroxynaphthalene-7-sulfonic acid or 1-hydroxynaphthalene-4-sulfonic acid for the 2-hydroxynaphthalene-6-sulfonic acid. The dye prepared from 2-hydroxynaphthalene-7-sulfonic acid dissolves in concentrated sulfuric acid to a red solution, that from 1-hydroxynaphthalene-4-sulfonic acid to a dichroic greenish-red solution.

*Example 2.*—The diazo compound, prepared according to Example 1 and corresponding to 6.9 parts of sodium nitrite, is filtered by suction, covered with a small quantity of water, then suspended in 400 parts of water and introduced into an ice-cold solution, rendered feebly alkaline by means of sodium carbonate, prepared from 29 parts of 1-acetylamino-8-hydroxynaphthalene-4-sulfonic acid in 500 parts of water. After addition of a further quantity of 7 parts of sodium carbonate, the whole is stirred for several hours and the dye is then salted out. It dissolves in concentrated sulfuric acid to a green solution. It dyes wool a Bordeaux tint fast to light and fulling.

As free acid it probably corresponds to the formula

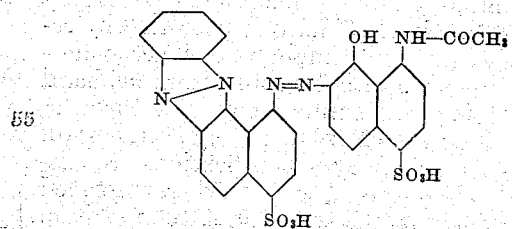

*Example 3.*—A quantity of the diazo compound obtained according to Example 1 and corresponding to 6.9 parts of sodium nitrite, is coupled with 25 parts of 1-aminonaphthalene-5-sulfonic acid while adding an excess of sodium carbonate. The dye dyes the animal fiber brick-red tints. It dissolves in concentrated sulfuric acid to a green solution.

As free acid it probably corresponds to the formula

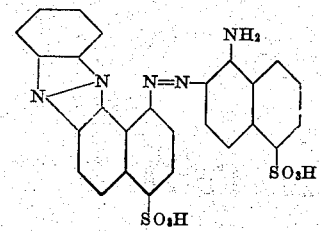

*Example 4.*—The same quantity of the diazo compound is coupled with an alkaline solution of 11 parts of resorcine. The dye dyes wool a clear yellowish-brown. It dissolves in concentrated sulfuric acid to a yellow-red solution.

As free acid it probably corresponds to the formula

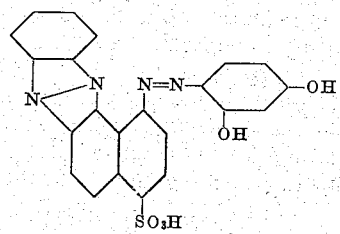

*Example 5.*—The diazo compound obtained according to Example 1 is coupled with a solution of the sodium salt of 4'-sulfo-1-phenyl-3-methyl-5-pyrazolone containing an excess of sodium carbonate or sodium acetate. The dye is isolated in the usual manner. It dissolves in concentrated sulfuric acid to a yellow solution and dyes the animal fiber pure yellow tints fast to light.

As free acid it probably corresponds to the formula:

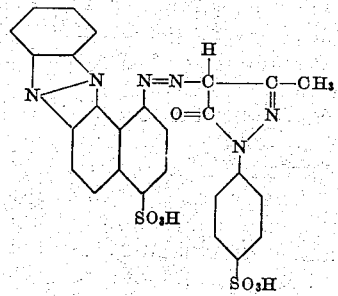

*Example 6.*—A quantity of the diazo compound, corresponding to 6.9 parts of sodium nitrite, from 8-amino-1.2-naphthophenazine-5-sulfonic acid is suspended in water and the suspension is introduced, while well stirring, into 15 parts of 2-hydroxynaphthalene, dissolved in the quantity of dilute sodium hydroxide solution required for dissolving it, while adding sodium carbonate in a quantity being more than sufficient for binding the free mineral acid. After the coupling is complete, the precipitation of the dye is completed by addition of sodium chloride solution; the dye is then filtered and dried or made into a paste. In dry condition the dye dissolves in concentrated sulfuric acid to a dichroic red-blue solution and in water to a yellow-red solution. It dyes wool a clear brick-red tint.

As free acid it probably corresponds to the formula:

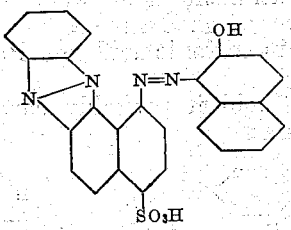

The dye yields insoluble barium salts and calcium salts which can be used as red pigments for oil colors or for printing wallpaper. The coatings and prints thus obtained have a very good covering power and fastness to light.

*Example 7.*—A suspension of 18 parts of aceto-acetic acid anilide is mixed, while well stirring, with a quantity, corresponding to 6.9 parts of sodium nitrite, of the diazo compound from 8-amino-1.2-naphthophenazine-5-sulfonic acid and so much of sodium carbonate is added thereto that there is an alkaline reaction when the coupling is complete. The isolated dye forms when dry a greenish-yellow powder which dissolves in concentrated sulfuric acid to a reddish-yellow solution and in water to a greenish-yellow solution.

As free acid it probably corresponds to the formula:

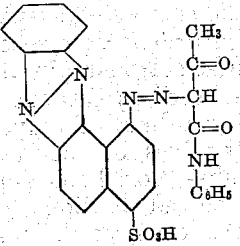

It can be used as coating or printing color, especially in the form of its insoluble barium or calcium salts with or without substratum or diluent. Clear yellow tints of good covering power and an excellent fastness to light are obtained.

A somewhat more reddish dye is obtained by using for coupling the aceto-acetic acid-2-toluidide instead of the anilide. Other derivatives of the aceto-acetic acid can be used in an analogous manner.

*Example 8.*—The aceto-actic acid derivative in example 7 is replaced by 1-phenyl-3-methyl-5-pyrazolone and a dye is obtained which is appropriated for the same purposes.

It yields reddish-yellow coatings. The dry dye dissolves in concentrated sulfuric acid to a yellow solution.

As free acid it probably corresponds to the formula

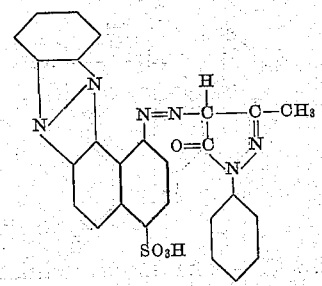

*Example 9.*—A solution of 70 parts of the sodium salt of 8-amino-1.2-naphthophenazine-5.5'-disulfonic acid (65%) (obtainable by condensing 8-acetyl amino-1.2-naphthoquinone-5-sulfonic acid with 1.2-diaminobenzene-5-sulfonic acid and splitting off the acetyl radicle) in 400 parts of water, is diazotized in the usual manner with 7 parts of nitrite and 24 parts of hydrochloric acid of 23° Bé. The feebly yellowish diazo solution is run into an ice-cold solution of 15 parts of 2-hydroxynaphthalene and the corresponding quantity of sodium hydroxide in 600 parts of water, and 20 parts of sodium carbonate are added thereto. The dye is isolated in the usual manner. It dissolves in water to a yellow-red solution and in concentrated sulfuric acid to a solution which is violet by transmitted light and blue by reflected light. The tints and other properties of the dyeings on wool are similar to those of Example 1.

As free acid it probably corresponds to the formula

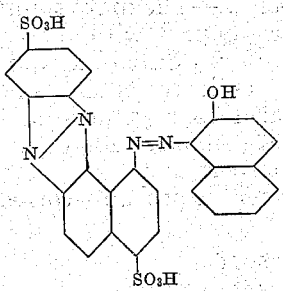

The analogous dye from 1-hydroxynaphthalene dyes the animal fiber Bordeaux tints; it dissolves in concentrated sulfuric acid to a marine blue solution.

*Example 10.*—The diazo compound of Example 9 is caused to act upon the corresponding quantity of a suspension of 1-phenyl-3-methyl-5-pyrazolone and a quantity of sodium carbonate more than required for neutralizing the acid is added thereto. The dye dissolves in water and concentrated sulfuric acid to a reddish-yellow solution and dyes wool a reddish-yellow tint of good fastness properties.

As free acid it probably corresponds to the formula

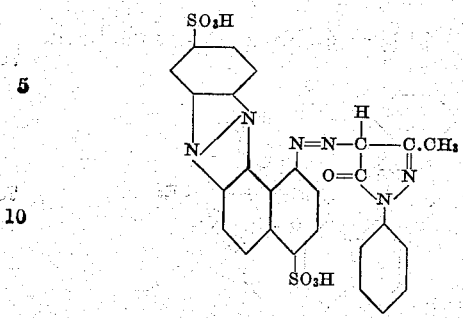

Example 11.—The same quantity of the diazo compound of Example 9 is run into an ice-cold solution of 18 parts of aceto-acetic acid anilide, dissolved in the equivalent quantity of dilute sodium hydroxide solution, while adding a quantity of sodium carbonate being more than sufficient for coupling. The dye is worked up in the usual manner. It dissolves in concentrated sulfuric acid to an orange-red solution, in water to a greenish-yellow solution and dyes wool a clear pure yellow of good fastness properties.

As free acid it probably corresponds to the formula:

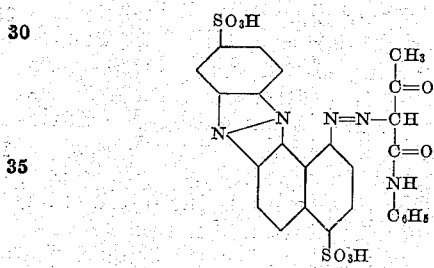

Example 12.—The diazo compound of Example 9 is coupled with the corresponding quantity of 2.4-dihydroxy-quinoline. The dye dissolves in water and in concentrated sulfuric acid to a yellow-red solution. It dyes the animal fiber yellow-red tints of good fastness properties.

As free acid it probably corresponds to the formula:

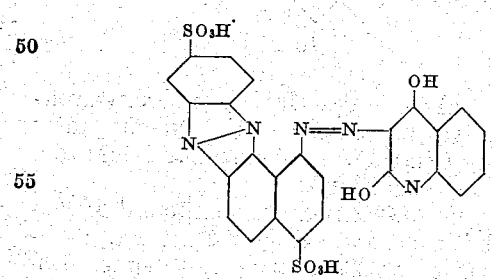

Example 13.—There is used instead of the 8-amino-1.2-naphthophenazine-disulfonic acid of Example 9 the 8-amino-1.2-naphthophenazine-5.7-disulfonic acid; the latter can be obtained, for instance, by condensing 8-acetylamino-1.2-naphthoquinone-5.7-disulfonic acid (prepared from 1-acetamino-8-hydroxynaphthalene-2.4-disulfonic acid by introducing the nitroso group, reducing and oxidizing) with 1.2-diaminobenzene and splitting off the acetyl group; it dissolves in water to a yellow solution and in concentrated sulfuric acid to a greenish-yellow solution.

The dye produced by coupling with 2-hydroxynaphthalene dyes wool a brownish-yellow tint of good fastness properties. It dissolves in sulfonic acid to a Bordeaux red solution.

As free acid it probably corresponds to the formula:

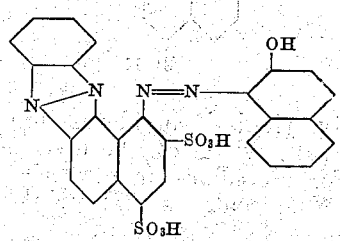

The dye from 1-phenyl-3-methyl-5-pyrazolone dyes the animal fiber clear reddish-yellow tints. It dissolves in concentrated sulfuric acid to a yellow solution.

Example 14.—The sodium salt of 8-amino-5'-chloro-1.2-naphthophenazine-5-sulfonic acid is prepared, for instance, by condensing 8-acetylamino-1.2-naphthoquinone-5-sulfonic acid with 1.2-diamino-4-chlorobenzene and subsequently splitting off the acetyl group; it is brick-red and dissolves in water to a yellowish-red solution and in concentrated sulfuric acid to a greenish-yellow solution. 38 parts of this compound are diazotized in the usual manner with hydrochloric acid and 6.9 parts of nitrite and the difficultly soluble diazo compound suspended in water, is coupled with 25 parts of sodium 2-hydroxynaphthalene-6-sulfonate in the presence of an excess of sodium carbonate. After stirring for several hours the dye may be salted out. It dissolves in concentrated sulfuric acid to a ruby-colored solution and in water to a yellowish-red solution. It dyes the animal fiber red tints, analogously to the dye obtained in Example 1.

As free acid it probably corresponds to the formula:

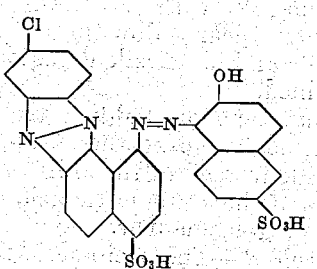

Example 15.—The sodium salt of 8-amino-5'-nitro-1.2-naphthophenazine-5-sulfonic acid is obtained, for instance, by condensing 8-acetylamino-1.2-naphthoquinone-5-sulfonic acid with 1.2-diamino-4-nitrobenzene and splitting off the acetyl group; it is dark violet and dissolves in water to a Bordeaux red solution and in concentrated sulfuric acid to a greenish-yellow solution. By combining the diazo compound of this naphthophenazine with 2-hydroxynaphthalene-6-sulfonic acid a dye is obtained which dissolves in concentrated sulfuric acid to a red solution and the aqueous solution of which dyes wool a reddish-brown tint of good fastness properties.

As free acid it probably corresponds to the formula:

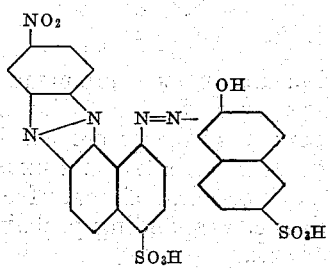

*Example 16.*—50 parts of 8-amino-1.2-naphthophenazine base are well stirred with 300 parts of water and 75 parts of hydrochloric acid of 23° Bé. After the colorless hydrochloride has been formed, 14 parts of sodium nitrite in 900 parts of water are gradually added at about 10° C. whereby a yellow solution of the diazo compound is formed. It is run, while stirring, into a solution of 70 parts of the neutral sodium salt of the 2-hydroxynaphthalene-3.6-disulfonic acid containing a quantity of sodium carbonate which is more than sufficient for binding the acid. The dye is salted out after several hours. It dissolves in concentrated sulfuric acid to a cherry-red solution and dyes wool a Bordeaux of good fastness to fulling and light.

As free acid it probably corresponds to the formula:

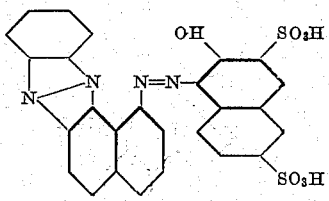

By coupling the same diazo compound with 1-hydroxynaphthalene-3.8-disulfonic acid, a dye is obtained which dissolves in concentrated sulfuric acid to a dichroic red-green solution and dyes wool a bluish-red tint fast to fulling and light.

*Example 17.*—A solution of the diazo compound, corresponding to 6.9 parts of sodium nitrate and, if required, filtered, from 8-amino-1.2-naphthophenazine is run, while stirring, into a solution of 19.5 parts of acetoacetic acid-2-toluidide in the equivalent quantity of dilute sodium hydroxide solution and the free acid is bound by an excess of sodium carbonate or sodium acetate. After the coupling is complete the dye is filtered, washed and made into a paste or dried. The coupling can also be carried out in the presence of dispersion agents, such as Turkey red oil or the like. The dry dye forms a reddish-yellow powder which dissolves in concentrated sulfuric acid to a yellowish-red solution.

It probably corresponds to the formula:

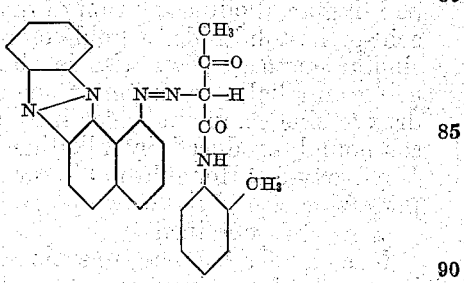

The dye is practically insoluble in alcohol and linseed oil. It can be used with or without additions as pigment of good covering power and fastness to light for oil colors or for printing wallpaper. Any of the usual substrata adapted for the production of lakes can already be added when preparing the dye.

*Example 18.*—The diazo compound used in Example 16 is caused to act upon the corresponding quantity of a solution of 2-hydroxynaphthalene containing an excess of alkali. The dye formed is, in dry condition, a red powder soluble in concentrated sulfuric acid to a solution which is red by transmitted light and green by reflected light. It dissolves in alcohol and indifferent organic solvents to deep yellowish-red solutions. In a mixture of stearin and ceresin it dissolves while hot to a solution of the same coloration. Dyed masses of this kind have a remarkable fastness to light.

Probably it corresponds to the formula:

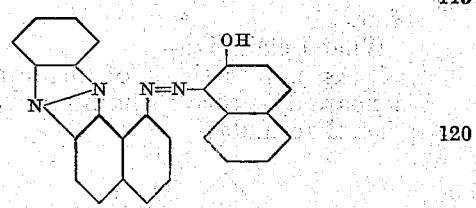

*Example 19.*—Cotton is impregnated in known manner with an alkaline solution of 2-hydroxynaphthalene-3-carboxylic acid-phenylamide and is then treated with a diazo solution of 8-amino-1.2-naphthophenazine, wherein the free mineral acid has been neutralized by means of sodium acetate. A reddish-brown tint of a good fastness to light and to kier-boiling is obtained.

The dye thus formed on the fiber corresponds to the formula:

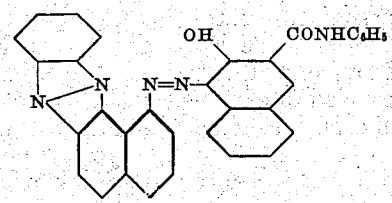

By using in the preceding example for padding an alkaline solution of diacetoacetic acid-ortho-tolidinide, a gold-colored tint of similar fastness properties is obtained; by using an alkaline solution of one of the hydroxy-azine compounds, for instance, of the compound produced by alkaline fusion of 4-hydroxy-8-sulfonaphtho-3'-, or 5'-aminophenazine, a neutral brown of good fastness properties is obtained.

It is obvious that my invention is not limited to the foregoing examples or to the details given therein. Though I have enumerated in these examples a great number of compounds of different groups capable to be coupled with teh diazo compounds in question, it may be stated that other azo components, such as, for instance, hydroxy or amino or hydroxyamino compounds of the benzene or naphthalene series may be used which are substituted in the nuclei by, for instance, halogen, alkyl, nitro, carboxy, oxyalkyl or similar radicles. On the other hand, 8-amino-1.2-naphthophenazine compounds other than those mentioned in the examples, may be used as diazo component. In this case, likewise, the nuclei may be substituted by the radicles enumerated above with respect to the azo components. Finally, I may use such an amino compound in which the sulfonic acid group or groups have a position either in the naphthalene or in the benzene nucleus other than that shown in the foregoing examples. All these variations are in the scope of my invention and are intended to be covered by the claims following hereafter.

What I claim is:—

1. As new articles of manufacture the monoazo dyes corresponding probably to the general formula:

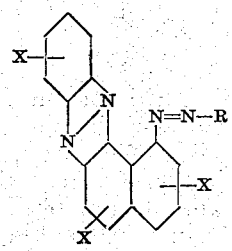

wherein R means an azo component and X stands for hydrogen or a univalent substituent of the group consisting of sulfo, carboxy, halogen, nitro, alkyl, and oxyalkyl.

2. As new articles of manufacture the monoazo dyes corresponding probably to the general formula:

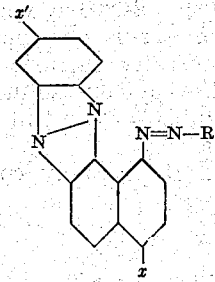

wherein R means an azo component, $x$ stands for hydrogen or sulfo and $x'$ for hydrogen or a substituent of the group consisting of sulfo, halogen, nitro, alkyl and oxyalkyl.

3. As new articles of manufacture the monoazo dyes corresponding probably to the general formula:

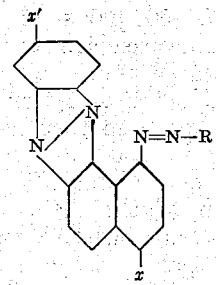

wherein R represents an azo component of the naphthalene series, $x$ stands for hydrogen or sulfo and $x'$ for hydrogen or a substituent of the group consisting of sulfo, halogen, nitro, alkyl, and oxyalkyl.

4. As new articles of manufacture the monoazo dyes corresponding probably to the general formula:

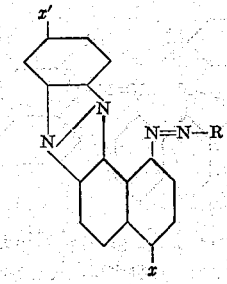

wherein R represents a hydroxynaphthalene compound, $x$ stands for hydrogen or sulfo and $x'$ for hydrogen or a substituent of the group consisting of sulfo, halogen, nitro, alkyl, and oxyalkyl.

5. As new articles of manufacture the monoazo dyes corresponding probably to the general formula:

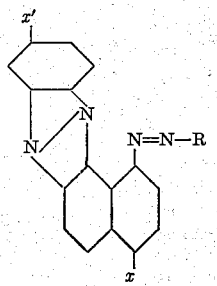

wherein R represents a hydroxynaphthalene sulfonic acid, $x$ stands for hydrogen or sulfo and $x'$ for hydrogen or a substituent of the group consisting of sulfo, halogen, nitro, alkyl, and oxyalkyl.

6. As new articles of manufacture the monoazo dyes corresponding probably to the general formula:

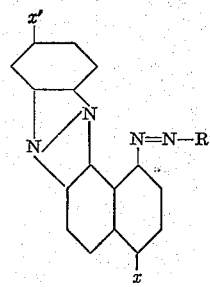

wherein R represents a β-hydroxynaphthalene sulfonic acid, $x$ stands for hydrogen or sulfo and $x'$ for hydrogen or a substituent of the group consisting of sulfo, halogen, nitro, alkyl, and oxyalkyl.

7. As a new article of manufacture the monoazo dye corresponding as free acid to the formula:

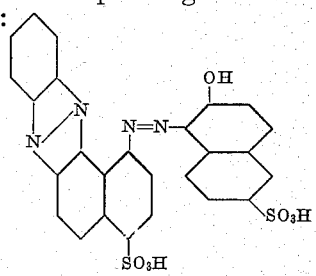

forming in the dry, pulverized state a red powder, soluble in water to yellowish-red solution and in concentrated sulfuric acid to a ruby-colored solution and dyeing wool red shades fast to fulling and having an unusually high fastness to light.

8. As a new article of manufacture the manoazo dye corresponding to the formula:

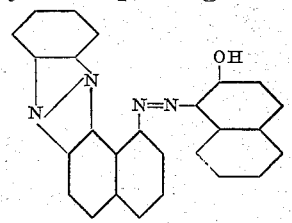

forming in the dry pulverized state a red powder insoluble in water, soluble in concentrated sulfuric acid to a solution which is red by transmitting light and green by reflected light, being likewise soluble in alcohol to a deep yellowish-red solution.

9. As new articles of manufacture the monoazo dyes corresponding as free acids probably to the general formula:

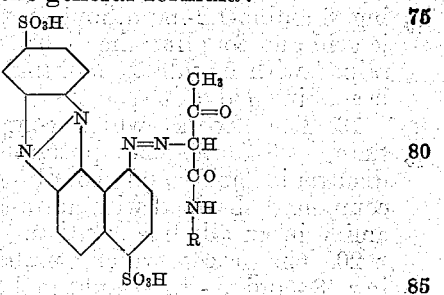

wherein R represents the phenyl or tolyl radicle, being in the dry pulverized state a dark powder, soluble in concentrated sulfuric acid to an orange-red solution, in water to a greenish-yellow solution, and dyeing wool clear yellow tints of good fastness.

10. The process which comprises diazotizing an 8-amino-1.2-naphthophenazine compound and reacting the diazo compound obtained upon a compound capable of being coupled with a diazo compound with the formation of an azo dye.

11. The process which comprises diazotizing an 8-amino-1.2-naphthophenazine compound and reacting the diazo compound obtained upon a hydroxy compound of the general formula HO-R, wherein R means a radicle of the group consisting of phenyl and naphthyl.

12. The process which comprises diazotizing an 8-amino-1.2-naphthophenazine compound and reacting the diazo compound obtained upon a keto compound capable of being coupled with a diazo compound with the formation of an azo dye.

13. The process which comprises diazotizing an 8-amino-1.2-naphthophenazine sulfonic acid and reacting the diazo compound obtained upon a compound capable of being coupled with a diazo compound with the formation of an azo dye.

14. The process which comprises diazotizing an 8-amino-1.2-naphthophenazine sulfonic acid and reacting the diazo compound obtained upon a hydroxy compound of the general formula HO-R, wherein R means a radicle of the group consisting of phenyl and naphthyl.

15. The process which comprises diazotizing an 8-amino-1.2-naphthophenazine sulfonic acid and reacting the diazo compound obtained upon a hydroxynaphthalene.

16. The process which comprises diazotizing an 8-amino-1.2-naphthophenazine sulfonic acid and reacting the diazo compound obtained upon a hydroxynaphthalene sulfonic acid.

17. The process which comprises diazotizing an 8-amino-1.2-naphthophenazine sulfonic acid and reacting the diazo compound obtained upon a keto compound capable of being coupled with a diazo compound with the formation of an azo dye.

18. The process which comprises diazotizing 8-amino-1.2-naphthophenazine-5-sulfonic acid and coupling the diazo compound obtained with 2-hydroxynaphthalene-5-sulfonic acid in an alkaline solution.

19. The process which comprises diazotizing 8-amino-1.2-naphthophenazine-5.5′-disulfonic acid and coupling the diazo compound obtained with aceto-acetylphenylamide in an alkaline solution.

20. The process which comprises diazotizing 8-amino-1.2-naphthophenazine and coupling the diazo compound obtained with β-hydroxynaphthalene in an alkaline solution.

In testimony whereof, I affix my signature.

HEINRICH OHLENDORF.